United States Patent
Hsieh et al.

(10) Patent No.: US 7,461,233 B2
(45) Date of Patent: Dec. 2, 2008

(54) METHOD FOR IDENTIFYING DATA CHARACTERISTICS FOR FLASH MEMORY

(75) Inventors: Jen-Wei Hsieh, Taipei (TW); Li-Pin Chang, Banciao (TW); Tei-Wei Kuo, Taipei (TW); Hsiang-Chi Hsieh, Sindian (TW)

(73) Assignee: Genesys Logic, Inc., Taipei (TW)

( * ) Notice: Subject to any disclaimer, the term of this patent is extended or adjusted under 35 U.S.C. 154(b) by 230 days.

(21) Appl. No.: 11/452,348

(22) Filed: Jun. 14, 2006

(65) Prior Publication Data
US 2007/0028033 A1    Feb. 1, 2007

(30) Foreign Application Priority Data
Jul. 29, 2005    (TW)    ............... 94125949 A

(51) Int. Cl.
    *G06F 12/00*    (2006.01)
(52) U.S. Cl. .............. 711/216; 711/103; 707/3
(58) Field of Classification Search ........... 711/103, 711/216, 219; 707/3
    See application file for complete search history.

(56) References Cited

U.S. PATENT DOCUMENTS

| | | | |
|---|---|---|---|
| 6,014,733 A * | 1/2000 | Bennett | 711/216 |
| 6,408,374 B1 * | 6/2002 | Calamvokis et al. | 711/216 |
| 6,988,180 B2 * | 1/2006 | Kadatch | 711/216 |
| 7,089,398 B2 * | 8/2006 | Zhang | 711/207 |
| 7,155,582 B2 * | 12/2006 | Ross | 711/158 |

* cited by examiner

Primary Examiner—Jasmine Song
(74) Attorney, Agent, or Firm—Rosenberg, Kleni & Lee

(57) ABSTRACT

A highly efficient data characteristic identification method for flash memory is provided, including the steps of: (a) based on the LBA corresponding to the write request to the flash memory, finding K corresponding counters in the hash table through K hash functions; (b) determining whether to perform decay period computation on hash table; if so, proceeding to step (c); otherwise, proceeding to step (d); (c) performing decay period computation on the hash table; (d) performing state update computation on the hash table; and (e) checking the hash table state and determining whether the data in the logic block corresponding to the flash memory is frequently updated. The method contains the decay period computation, state update computation, and checking on the data in the corresponding counters in the hash table to determine whether the data is frequently updated. Therefore, the object of a highly efficient data access characteristic identification method for flash memory is provided.

6 Claims, 11 Drawing Sheets

METHOD FOR IDENTIFYING DATA CHARACTERISTICS FOR FLASH MEMORY

BACKGROUND OF THE INVENTION

1. Field of the Invention

The present invention relates to a method for efficient identification of data characteristics for flash memory and, more particularly, to a method having a plurality of hashing units to efficiently identify the characteristics of the data stored in logical block address, applicable to data access to flash memory.

2. The Related Arts

The flash memory is widely used in storing multimedia data, such as digital images or audio data. However, during the access process, the conventional flash memory requires a plurality of logical block addresses (LBA) to store the system storage time of the flash memory to provide the data update time of the stored data to the flash memory access control circuit on the devices, such as digital camera, cell phone, card reader or computer, for file editing and management. Therefore, the frequency of data update and related state information is an important identification parameter for the flash memory access control.

There are two conventional methods to identify how often the data in flash memory is updated. The first method, as disclosed in the paper by M. L. Chiang, Paul C. H. Lee and R. C. Chang, "Managing Flash Memory in Personal Communication Devices," ISCE, 1997, December (pp. 177-182), is to maintain a large array for storing the last access time of all the LBA that the system can possibly access. When the system receives a new write request, the current system time is compared with the last access time of the LBA. If the difference between the two is within a system-defined range, the data is identified as being frequently updated; otherwise, the data is identified as being infrequently updated. The drawback of this method is that it uses a large amount of memory. For example, for a 512 M bytes flash memory, with 512-bytes as an access unit, there will be 1,048,576 LBA for access. If four bytes are required for storing a time unit, this method requires 4M bytes for storing the time information.

The second method, as disclosed by L. P. Chang and T. W. Kuo, "An Adaptive Striping Architecture for Flash memory Storage Systems of Embedded Systems," 8th IEEE RTAS, September 2002 (pp. 187-196), is to use two linked lists to record the recently accessed LBA. The first linked list is a hot list, with each node of the hot list storing an LBA whose data is frequently updated. The second list is a candidate list, which is an under-study of the first list. To save the memory, the length of each list is restricted. For example, the first list has 512 nodes, and the second list has 1024 nodes. When the system receives a write request, the system First checks whether the corresponding LBA is in the hot list. If so, the LBA is identified as being frequently updated, and the corresponding node for the LBA is moved to the head of the hot list. Otherwise, the LBA is identified as being infrequently updated, and is checked to determine whether it is in the candidate list. If the LBA is in the candidate list, the corresponding node is added to the head of the hot list, and if the hot list is full, the last node of the hot list is moved to the head of the candidate list. If the LBA is not in the candidate list, the LAB is stored in a new node and the new node is added to the head of the candidate list, and if the candidate list is full, the last node of the candidate list is removed.

Although the second method consumes less memory than the first method, the drawback of the second method is that the execution time is unstable. This is because the system may find the node at the head of the first list, or may search the entire two lists without finding the node. This causes the unstable factor of the flash access and the CPU cycle to affect the overall efficiency of the flash memory usage.

SUMMARY OF THE INVENTION

The present invention is made to overcome the aforementioned drawback of the conventional methods. The primary object of the present invention is to provide a low memory-consumption data characteristic identification method for flash memory, using a hash function and a hash table defined by the logic block address corresponding to the flash memory write request to reduce the memory size required for data characteristic identification of flash memory logic blocks.

Another object of the present invention is to provide a highly efficient data characteristic identification method for flash memory. By computing decay period, state update and state checking when the hash table defined by the corresponding logic block of flash memory accepting the write request, the method of the present invention can rapidly identify data characteristics of the flash memory. The method has minimum execution time and higher stability in data characteristic identification.

To achieve the aforementioned objects, the present invention provides a highly efficient data characteristic identification method for flash memory, including the steps of: (a) based on the LBA corresponding to the write request to the flash memory, finding K corresponding counters in the hash table through K hash functions; (b) determining whether decay period computation on hash table; if so, proceeding to step (c); otherwise, proceeding to step (d); (c) performing decay period computation on the hash table; (d) performing state update computation on the hash table; and (e) checking the hash table state and determining whether the data in the logic block corresponding to the flash memory is frequently updated. The method contains the decay period computation, state update computation, and checking on the data in the corresponding counters in the hash table to determine whether the data is frequently updated. Therefore, the object of a highly efficient data access characteristic identification method for flash memory is provided.

These and other objects, features and advantages of the invention will be apparent to those skilled in the art, from a reading of the following brief description of the drawings, the detailed description of the preferred embodiment, and the appended claims.

BRIEF DESCRIPTION OF THE DRAWINGS

The present invention can be understood in more detail by reading the subsequent detailed description in conjunction with the examples and references made to the accompanying drawings, wherein.

DETAILED DESCRIPTION OF THE INVENTION

Figure 1:
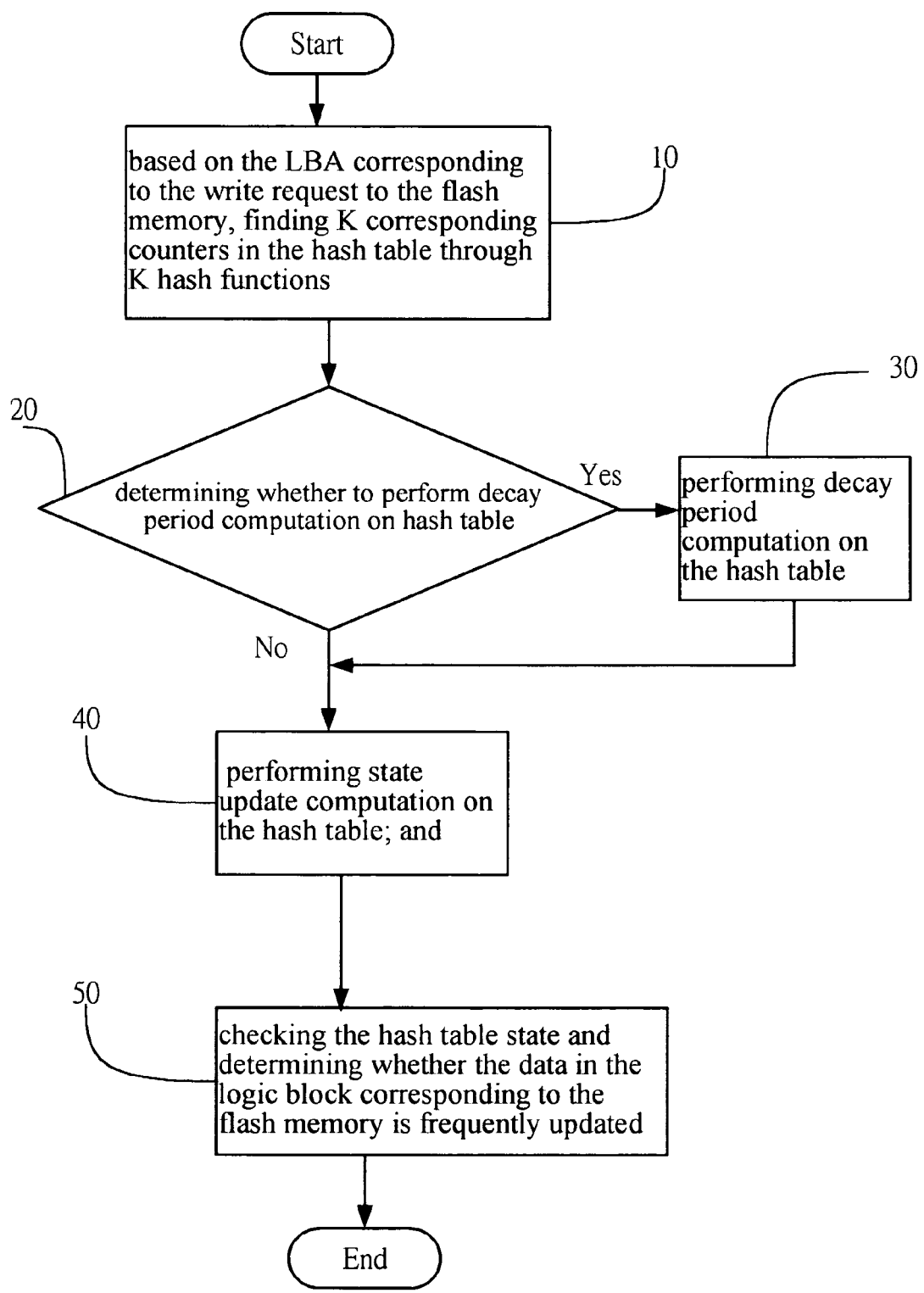
FIG. 1 is a flowchart of the present invention.

With reference to the drawings and in particular to FIG. 1, a flowchart of a data characteristic identification method of the present invention comprises the steps of:

(10) based on the LBA corresponding to the write request to the flash memory, finding K corresponding counters in the hash table through K hash functions;

(20) determining whether to perform decay period computation on hash table; if so, proceeding to step (30); otherwise, proceeding to step (40);

(30) performing decay period computation on the hash table;

(40) performing state update computation on the hash table; and

(50) checking the hash table state and determining whether the data in the corresponding LBA is frequently updated.

Figure 2:
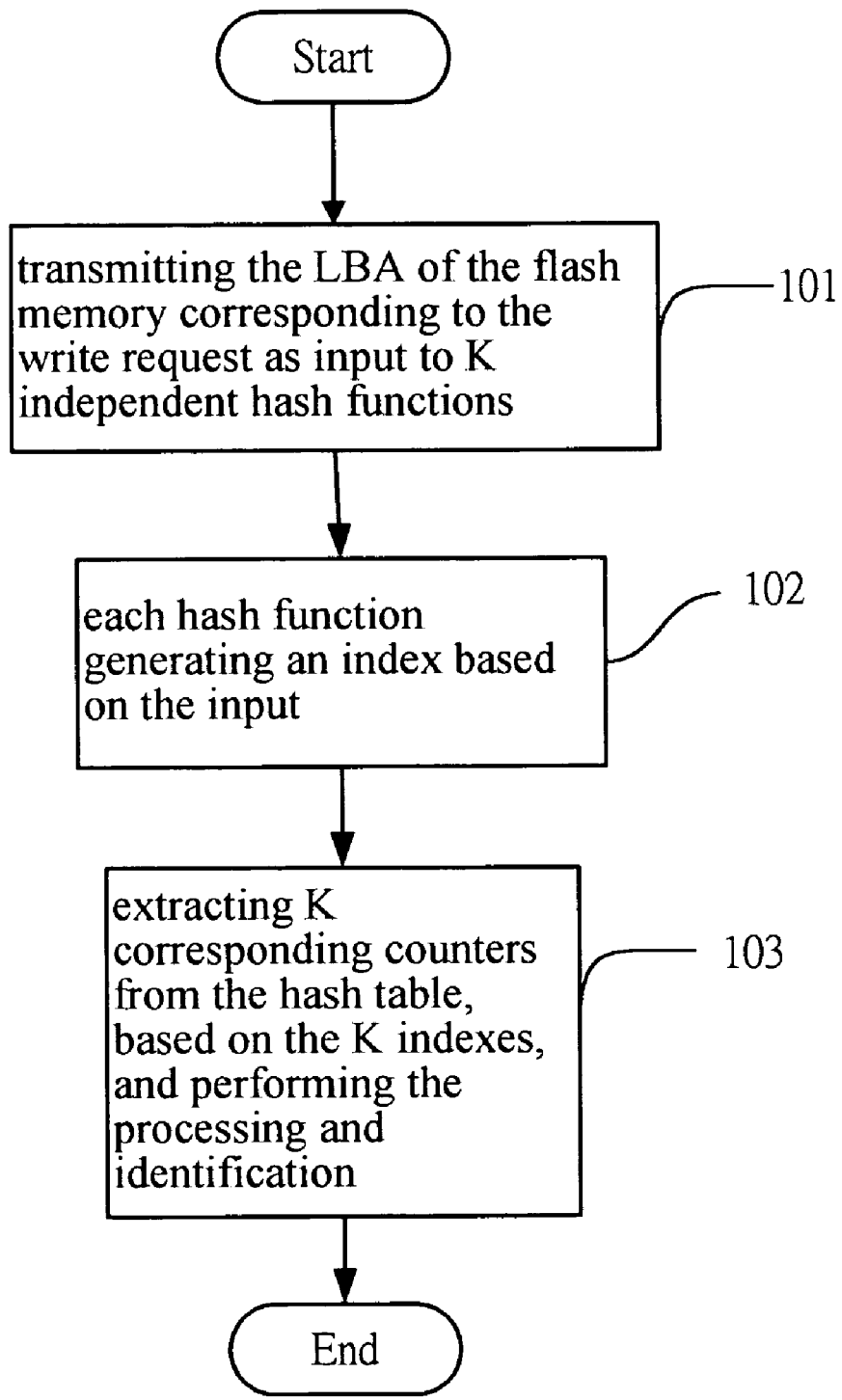
FIG. 2 is a flowchart of the step of finding K corresponding counters in the hash table through K hash functions.
Figure 3:
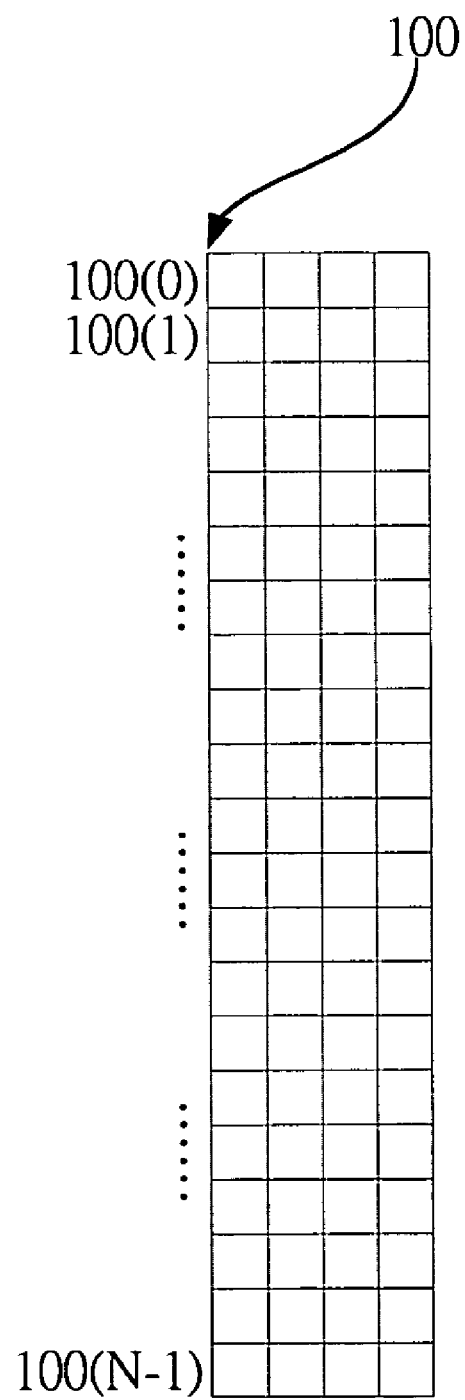
FIG. 3 is the schematic view of the hash table for the flowchart of the step of finding K corresponding counters in the hash table through K hash functions of FIG. 2.

Also referring to FIGS. 2 and 3, which are the flowchart and the hash table contents of the aforementioned step (10), step (10) of finding K corresponding counters in the hash table through K hash functions based on the LBA corresponding to the write request to the flash memory further includes the following steps of:

(101) transmitting the LBA of the flash memory corresponding to the write request as input to K independent hash functions;

(102) each hash function generating an index based on the input; and (103) extracting K corresponding counters from the hash table, based on the K indexes, and performing the processing and identification.

The hash table is structured as shown in FIG. 3. The hash table 100 includes N 4-bit counters 100(0)-100(N−1).

Figure 4:
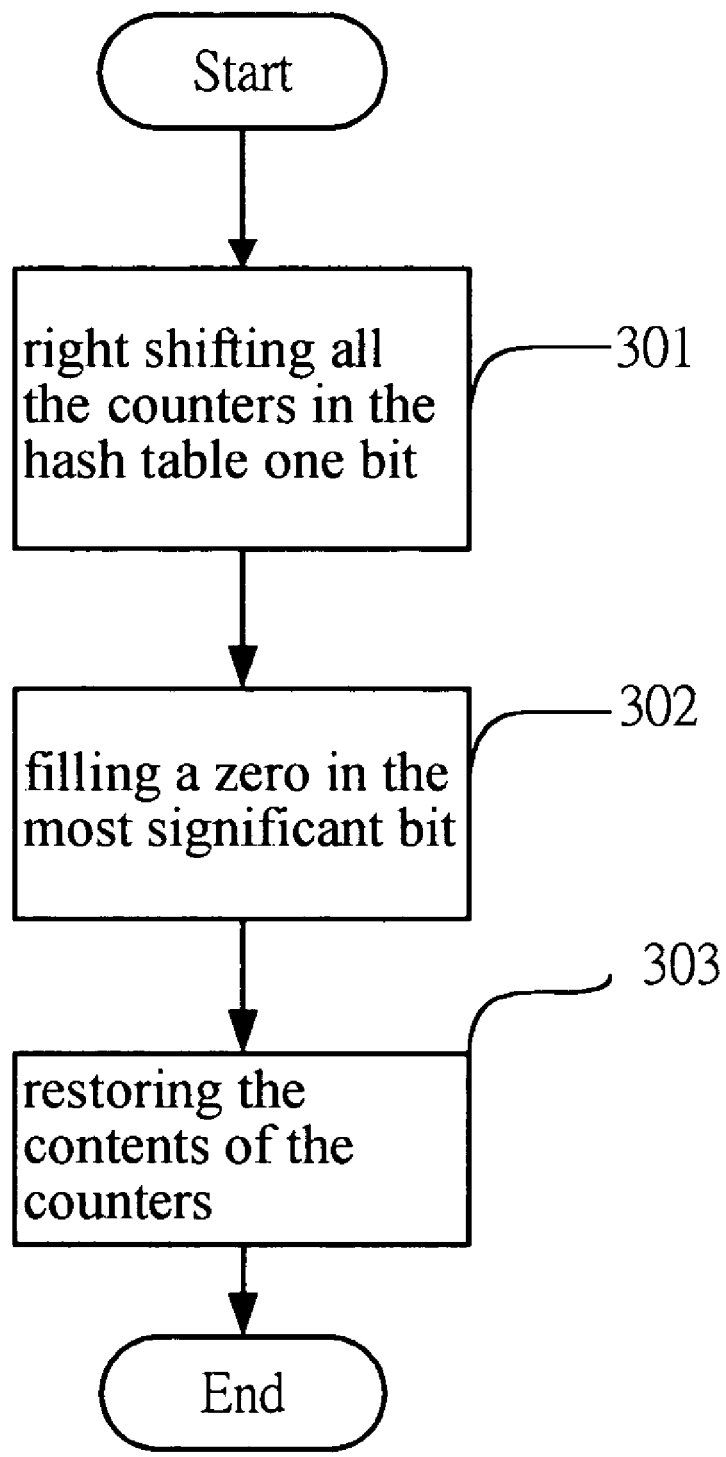
FIG. 4 is a flowchart of decay period computation.
Figure 5:
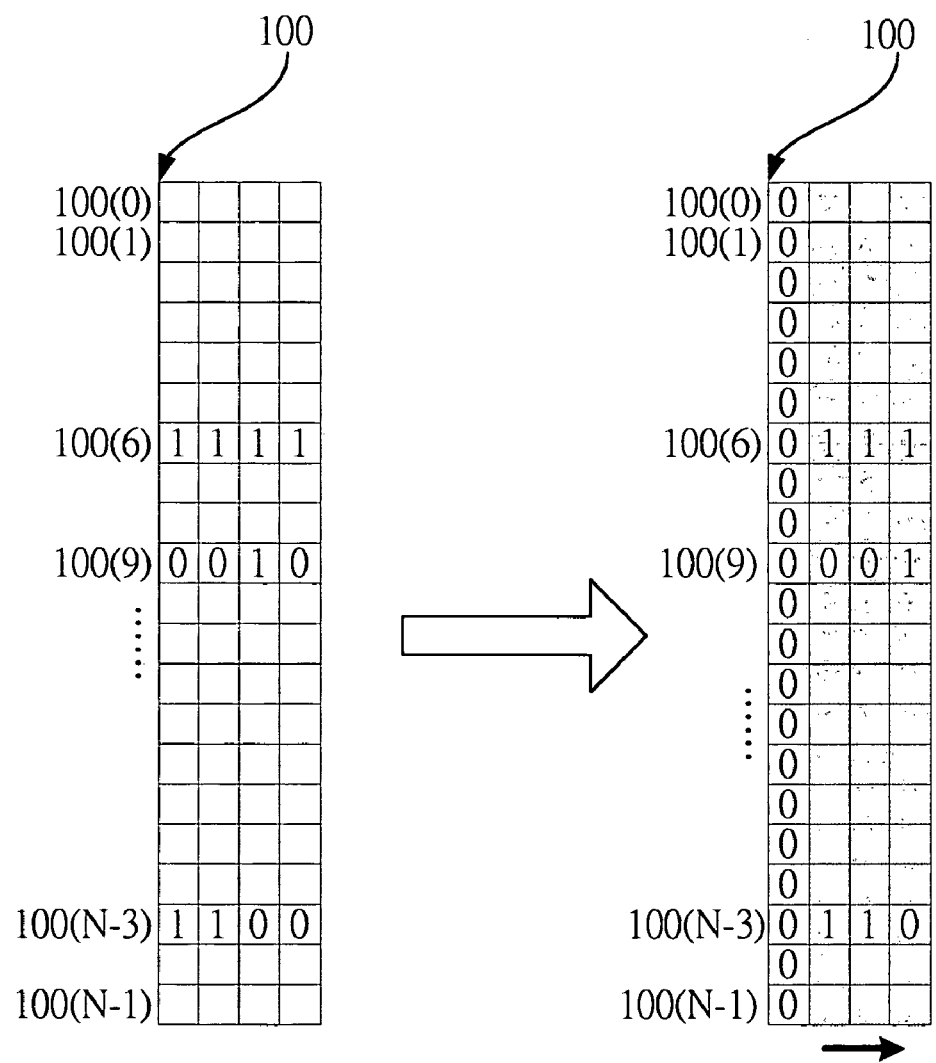
FIG. 5 is a schematic view of the hash table during the decay period computation.

Referring now to FIGS. 4 and 5, which are the flowchart and the hash table contents of the aforementioned step (30), step (30) of performing decay period computation on the hash table includes the following steps:

(301) right shifting all the counters in the hash table one bit;

(302) filling a zero in the most significant bit; and (303) restoring the contents of the counters.

The above decay period computation is required to perform after M write requests to the flash memory. That is, after step (20) of checking whether M write requests have been processing to determine a decay period computation is required. This is to prevent counters 100(0)-100(N−1) from over-accumulated to distort the identification of data characteristics. FIG. 5 shows the state of counters 100(0)-100(N−1) during the decay period computation. The decay period computation of hash table 100 is not limited to the above steps (301)-(303). Any equivalent numerical processing methods are also within the scope of the present invention.

Figure 6:
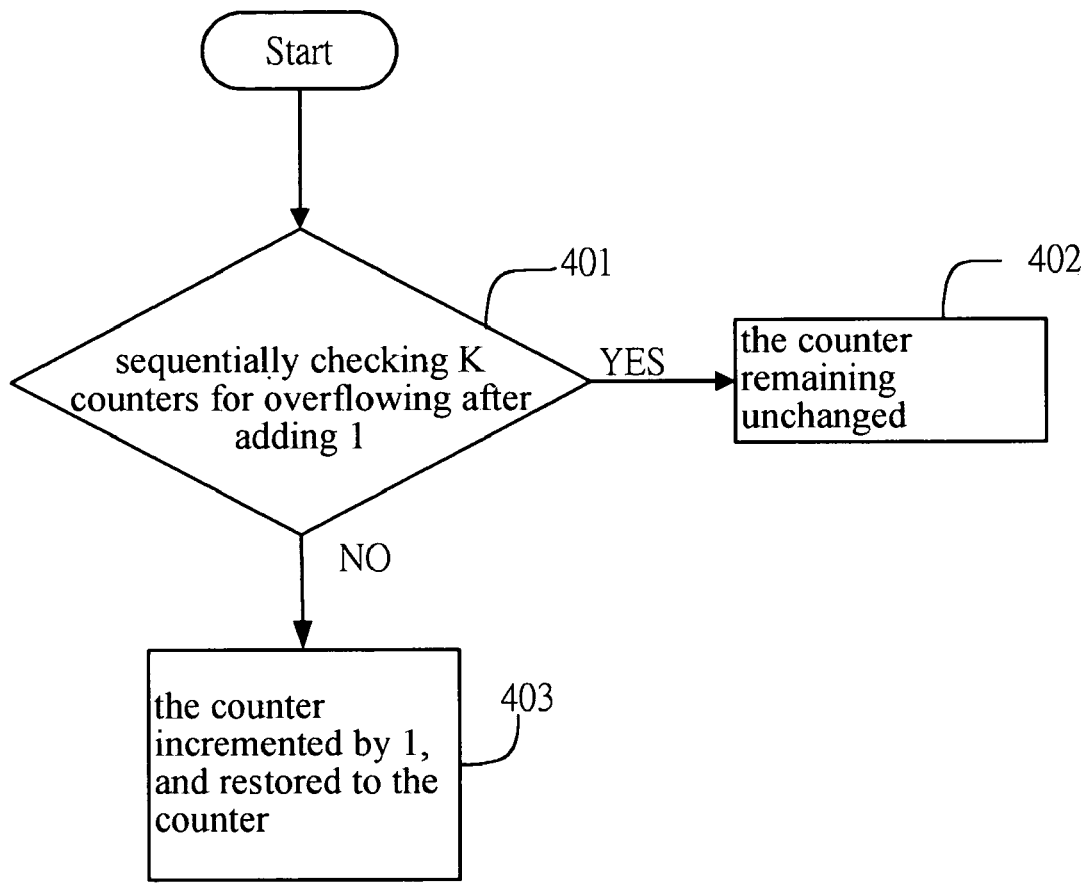
FIG. 6 is a flowchart of the first embodiment of the step of state update computation.
Figure 7:
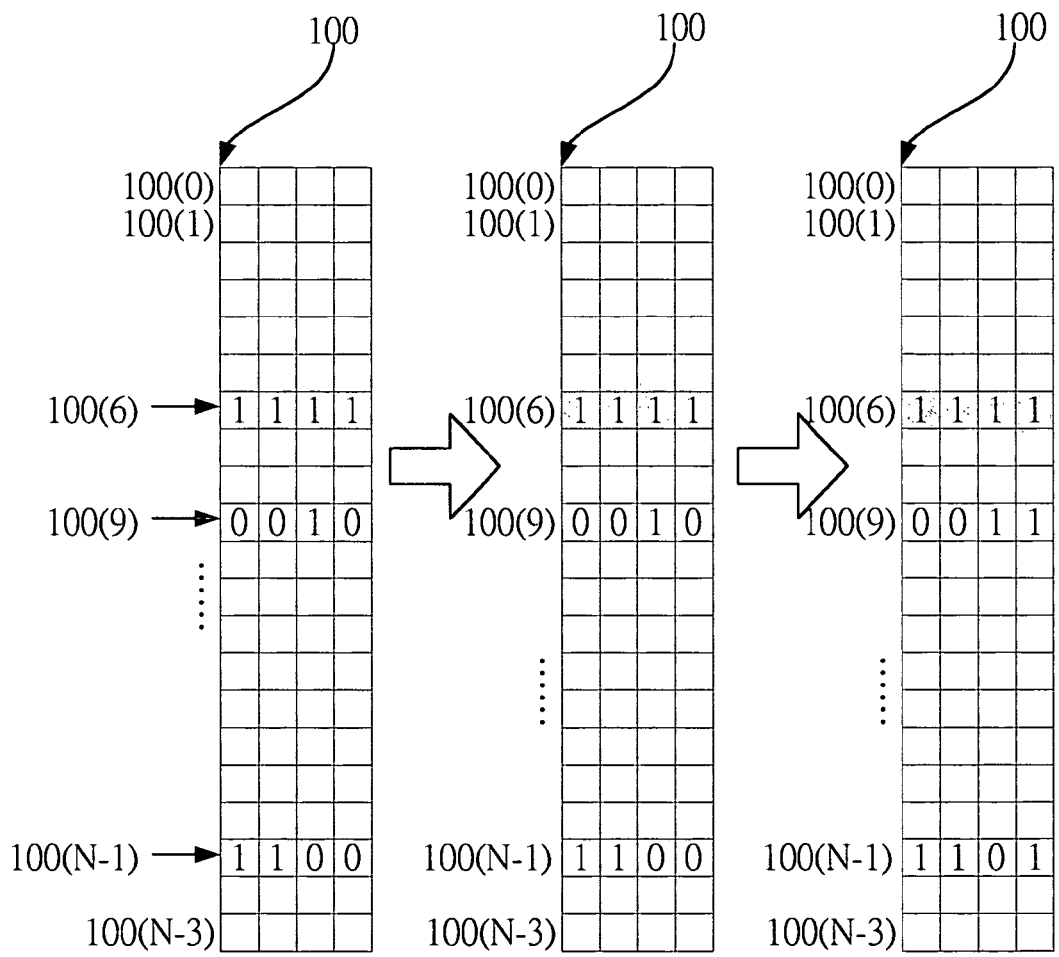
FIG. 7 is a schematic view of the hash table during the state update computation for the embodiment of FIG. 6.

Referring to FIGS. 6 and 7, which are the flowchart and the hash table contents of the aforementioned step (40), step (40) of performing state update computation on the hash table comprises the following steps of:

(401) sequentially checking K counters for overflowing after adding 1; if so, proceeding to step (402); otherwise, proceeding to step (403);

(402) the counter remaining unchanged; and (403) the counter incremented by 1, and restored to the counter.

Through steps (401)-(403), the contents of the hash table 100 can truly reflect the data update characteristics of the corresponding LBA of flash memory. The state is as shown in FIG. 7. Counters 100(6), 100(9), 100(N−3) of the hash table 100 are the three counters found by using the LBA of the flash memory as the input to three hash functions. In the above example, counter 100(6) is $1111_2$, which will overflow after adding 1. Therefore, the contents of counter 100(6) remain the same. On the other hand, the contents of counters 100(9), 100(N−3) are $0010_2$, $1100_2$, respectively. Therefore, both are incremented by 1 and restored to the counters. As the arrow sign indicated in FIG. 7, the final contents of counter 100(9) and 100(N−3) are 00112 and 11012, respectively.

Figure 8:
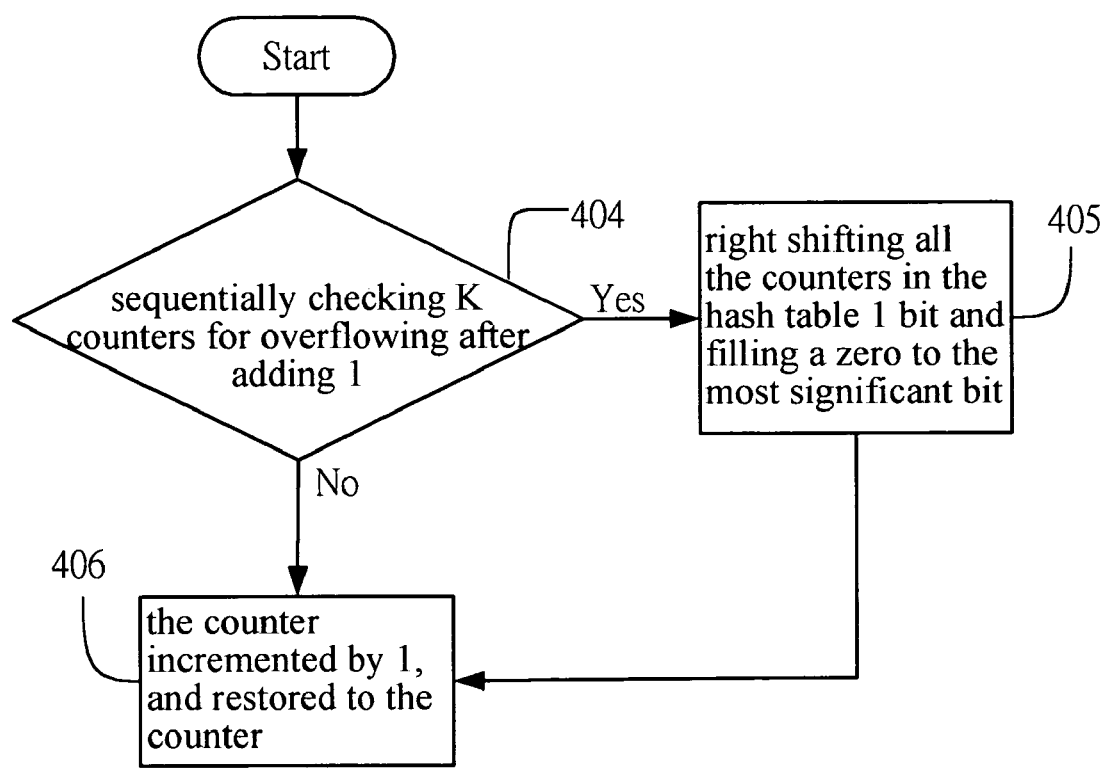
FIG. 8 is a flowchart of the second embodiment of the step of state update computation.
Figure 9:
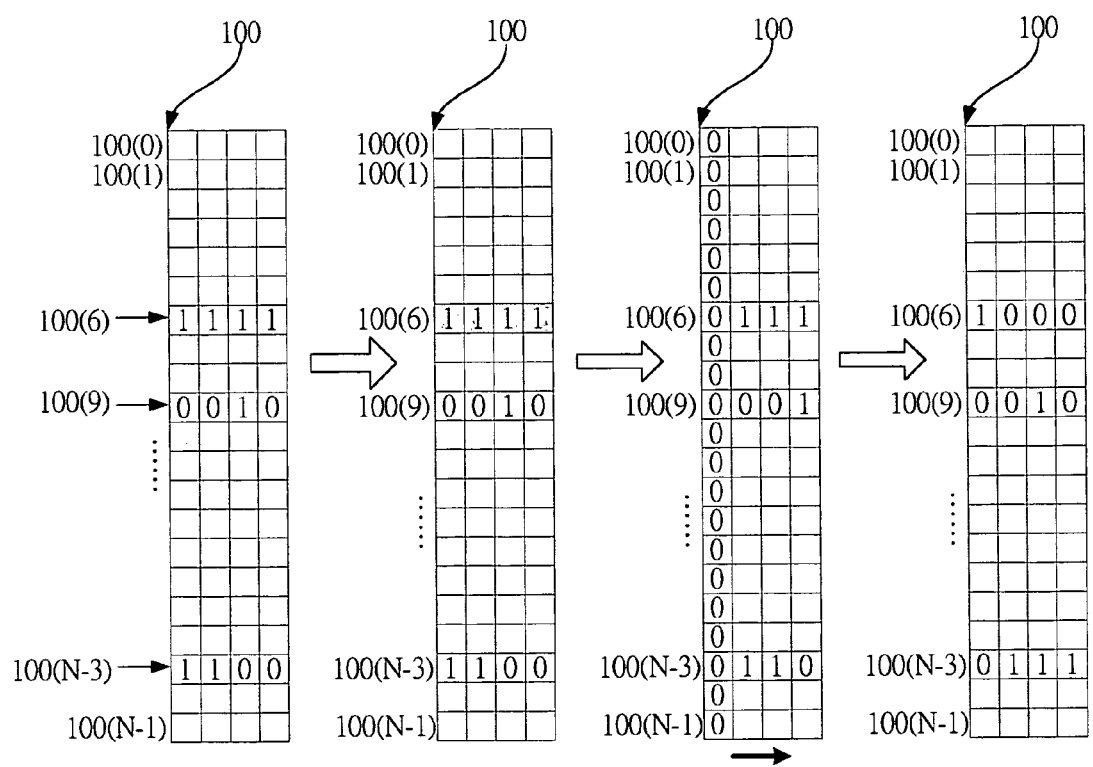
FIG. 9 is a schematic view of the hash table during the state update computation for the embodiment of FIG. 8.

FIGS. 8 and 9 show the flowchart and the hash table contents of the second embodiment of the aforementioned step (40), respectively. The second embodiment further comprises the steps of:

(404) sequentially checking K counters for overflowing after adding 1; if so, proceeding to step (405); otherwise, proceeding to step (406);

(405) right shifting all the counters in the hash table 1 bit and filling a zero to the most significant bit; and (406) the counter incremented by 1, and restored to the counter.

Through steps (404)-(406), the contents of the hash table 100 can truly reflect the data update characteristics of the corresponding LBA of flash memory. The state is as shown in FIG. 9. Counters 100(6), 100(9), 100(N−3) of the hash table 100 are the three counters found by using the LBA of the flash memory as the input to three hash functions. In the above example, counter 100(6) is $1111_2$, which will overflow after adding 1. Therefore, the contents of counter 100(0)-100(N−1) are shifted 1 bit to the right and a zero is filled on the most significant bit of all the counters. Then, the contents of counters 100(6), 100(9), 100(N−3) are incremented by 1 and restored. As the arrow sign indicated in FIG. 9, the final contents of counter 100(6), 100(9) and 100(N−3) are $1000_2$, $0010_2$ and $0111_2$, respectively.

Figure 10:
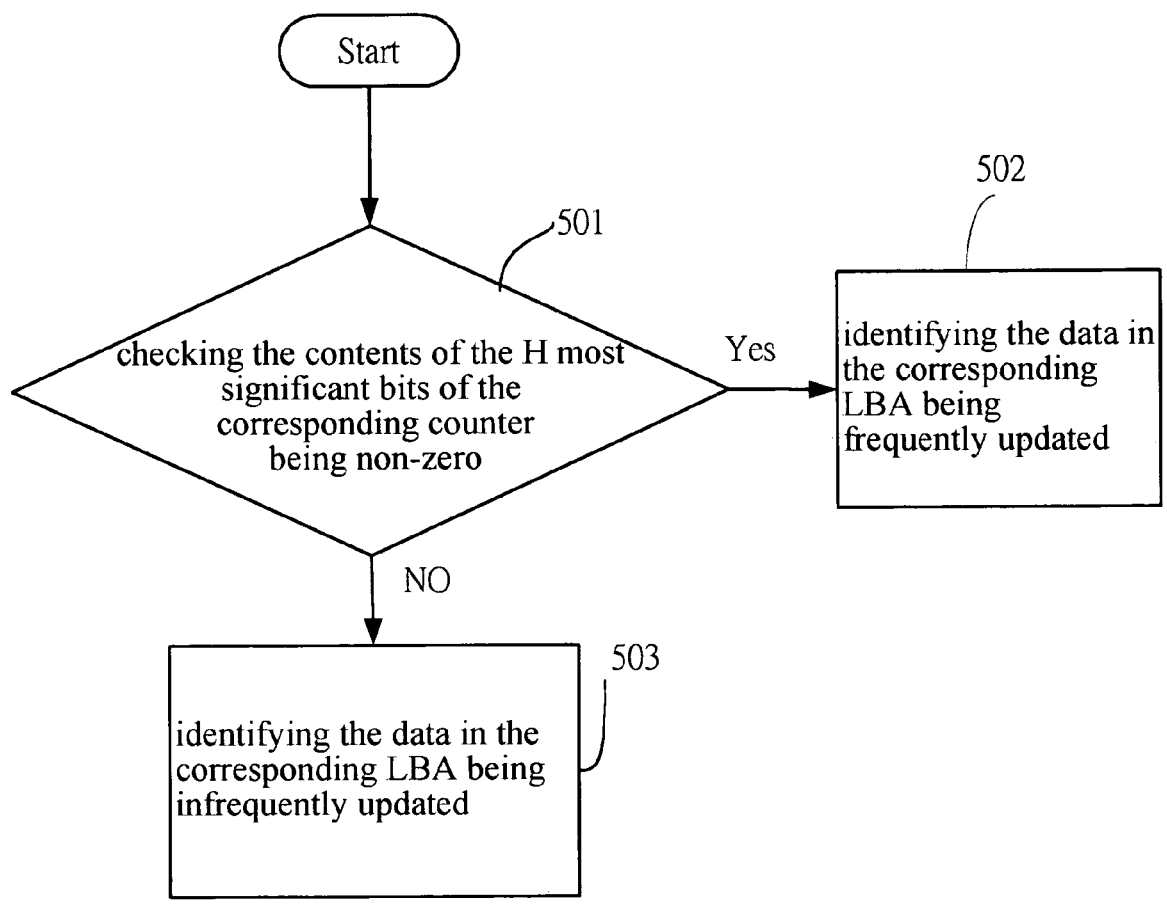
FIG. 10 is a flowchart of the step of state checking.
Figure 11:
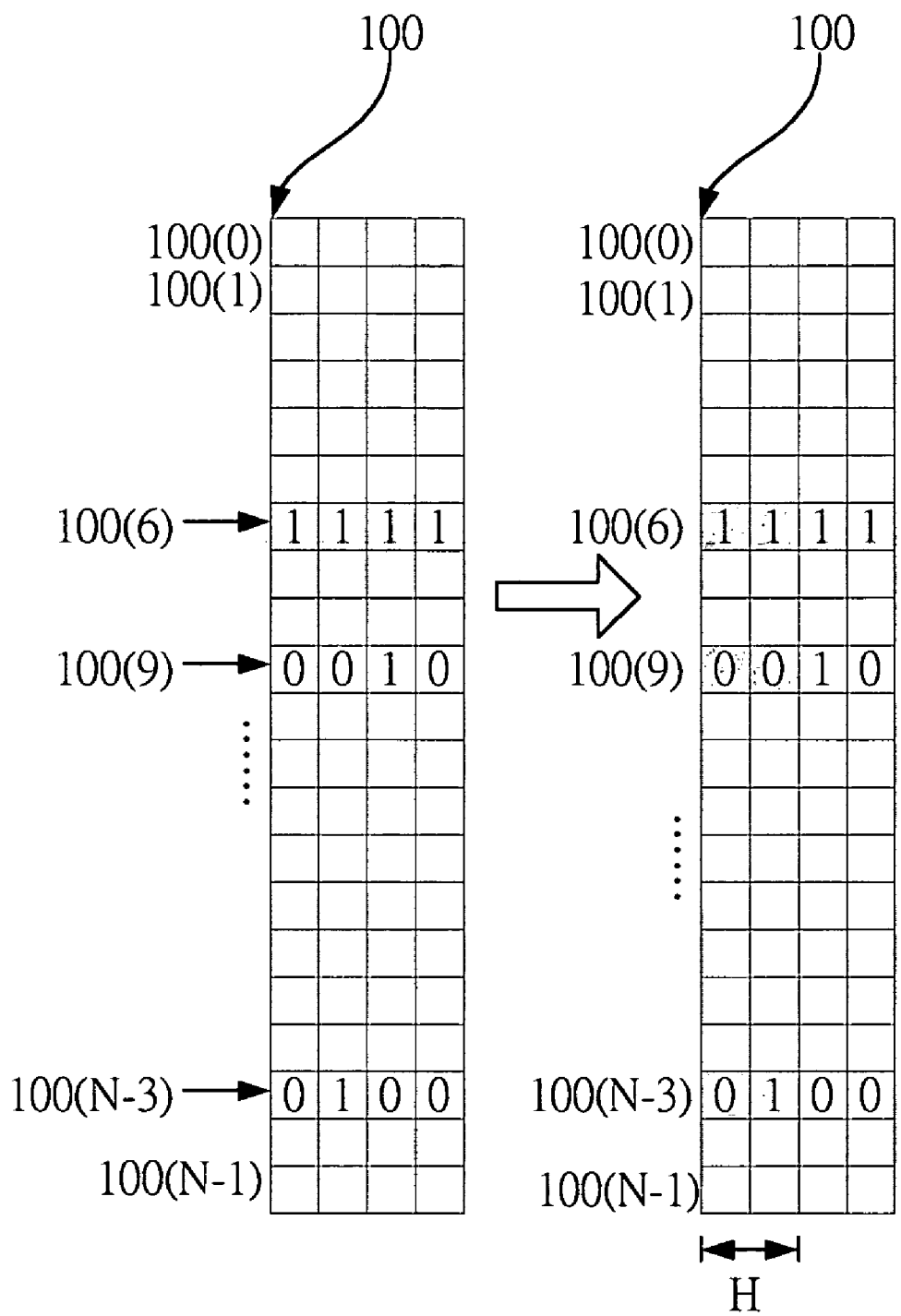
FIG. 11 is a schematic view of the hash table during the state checking of FIG. 10.

Referring to FIGS. 10 and 11, which are the flowchart and the hash table contents of the aforementioned step (50), step (50) of checking the hash table state and determining whether the data in the corresponding LBA is frequently updated further includes the following steps of:

(501) checking the contents of the H most significant bits of the corresponding counter being non-zero; if so, proceeding to step (502); otherwise, proceeding to step (503);

(502) identifying the data in the corresponding LBA being frequently updated; and (503) identifying the data in the corresponding LBA being infrequently updated.

Through steps (501)-(503), the contents of hash table 100 can provide the identification standard for the data update characteristics of the corresponding LBA of flash memory. As shown in FIG. 11, counters 100(6), 100(9), 100(N−3) of the hash table 100 correspond to the addresses of the LBA of the flash memory for the data update. After steps (401)-(403) or steps (404)-(406), the contents of counters 100(6), 100(9) and 100(N−3) are $1111_2$, $0010_2$ and $0100_2$, respectively. The H most significant bits of the counters are checked for all-zero. The H is not limited to any specific value. For example, when H is 2, the most significant bit and the second most significant bit are checked. As seen in the above example, the first two bits of counter 100(9) are all-zero, and therefore, the data in the LBA of the flash memory corresponding to counters 100

(6), 100(9), 100(N–3) are identified as being infrequently updated, as shown by the arrow in FIG. 11.

While the invention has been described in connection with what is presently considered to the most practical and preferred embodiment, it is to be understood that the invention is not to be limited to the disclosed embodiment, but on the contrary, is intended to cover various modifications and equivalent arrangement included within the spirit and scope of the appended claims.

What is claimed is:

1. A method of data characteristic identification for flash memory, comprising the following steps:
   (A) based on an LBA corresponding to a write request to the flash memory, finding K corresponding counters in a hash table through K hash functions, the step of finding K corresponding counters including the steps of:
      (A1) transmitting the LBA of the flash memory corresponding to the write request as input to K independent hash functions;
      (A2) each hash function generating an index based on the input; and
      (A3) extracting K corresponding counters from the hash table, based on K indexes, and performing the processing and identification;
   (B) determining whether to perform decay period computation on hash table; if so, proceeding to step (C); otherwise, proceeding to step (D);
   (C) performing decay period computation on the hash table;
   (D) performing state update computation on the hash table; and
   (E) checking the hash table state and determining whether the data in the corresponding LBA is frequently updated.

2. The method as claimed in claim 1, wherein step (C) further comprises the following steps: (C1) right shifting all the counters in the hash table one bit; (C2) filling a zero in the most significant bit; and (C3) restoring the contents of the counters.

3. The method as claimed in claim 2, wherein the most significant bit of step (C3) is the most significant bit of the counter.

4. The method as claimed in claim 1, wherein step (D) further comprises the following steps: (D1) sequentially checking K counters for overflowing after adding 1; if so, proceeding to step (D2); otherwise, proceeding to step (D3); (D2) the counter remaining unchanged; and (D3) the counter incremented by 1, and restored to the counter.

5. The method as claimed in claim 1, wherein step (D) further comprises the following steps: (D4) sequentially checking K counters for overflowing after adding 1; if so, proceeding to step (D5); otherwise, proceeding to step (D6); (D5) right shifting all the counters in the hash table 1 bit and filling a zero to the most significant bit; and (D6) the counter incremented by 1, and restored to the counter.

6. The method as claimed in claim 1, wherein step (E) further comprises the following steps: (E1) checking the contents of the H most significant bits of the corresponding counter being non-zero; if so, proceeding to step (E2); otherwise, proceeding to step (E3); (E2) identifying the data in the corresponding LBA being frequently updated; and (E3) identifying the data in the corresponding LBA being infrequently updated.

* * * * *